Feb. 27, 1951 — L. J. M. BONJOUR — 2,543,225
DRAWING OF FLAT GLASS
Filed Sept. 22, 1945 — 2 Sheets-Sheet 1
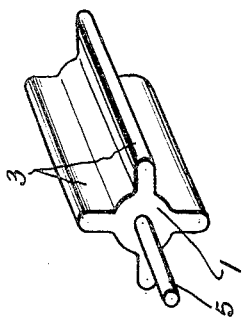
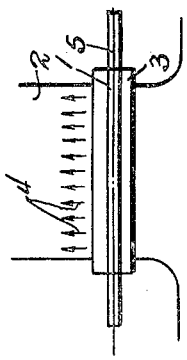
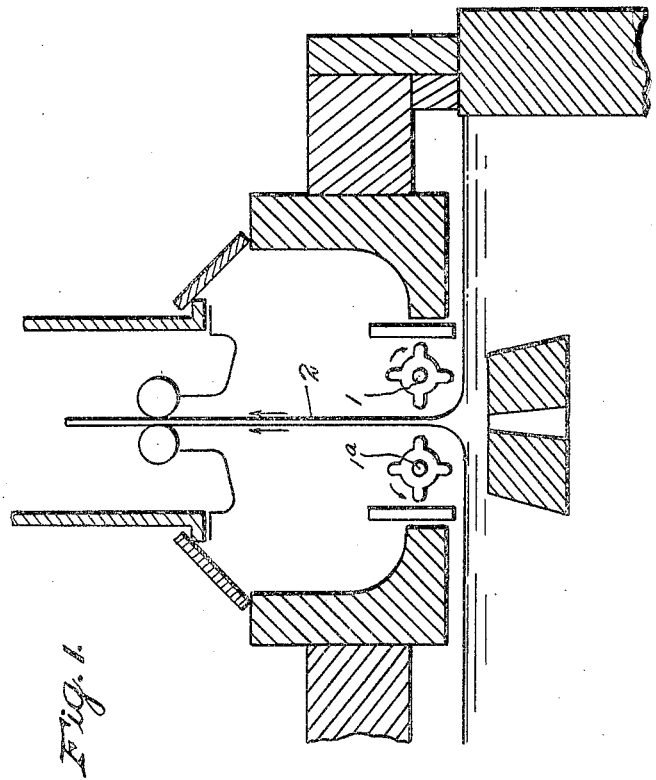
Inventor
Louis Jean Marie Bonjour
By Olen E. Bee
Attorney

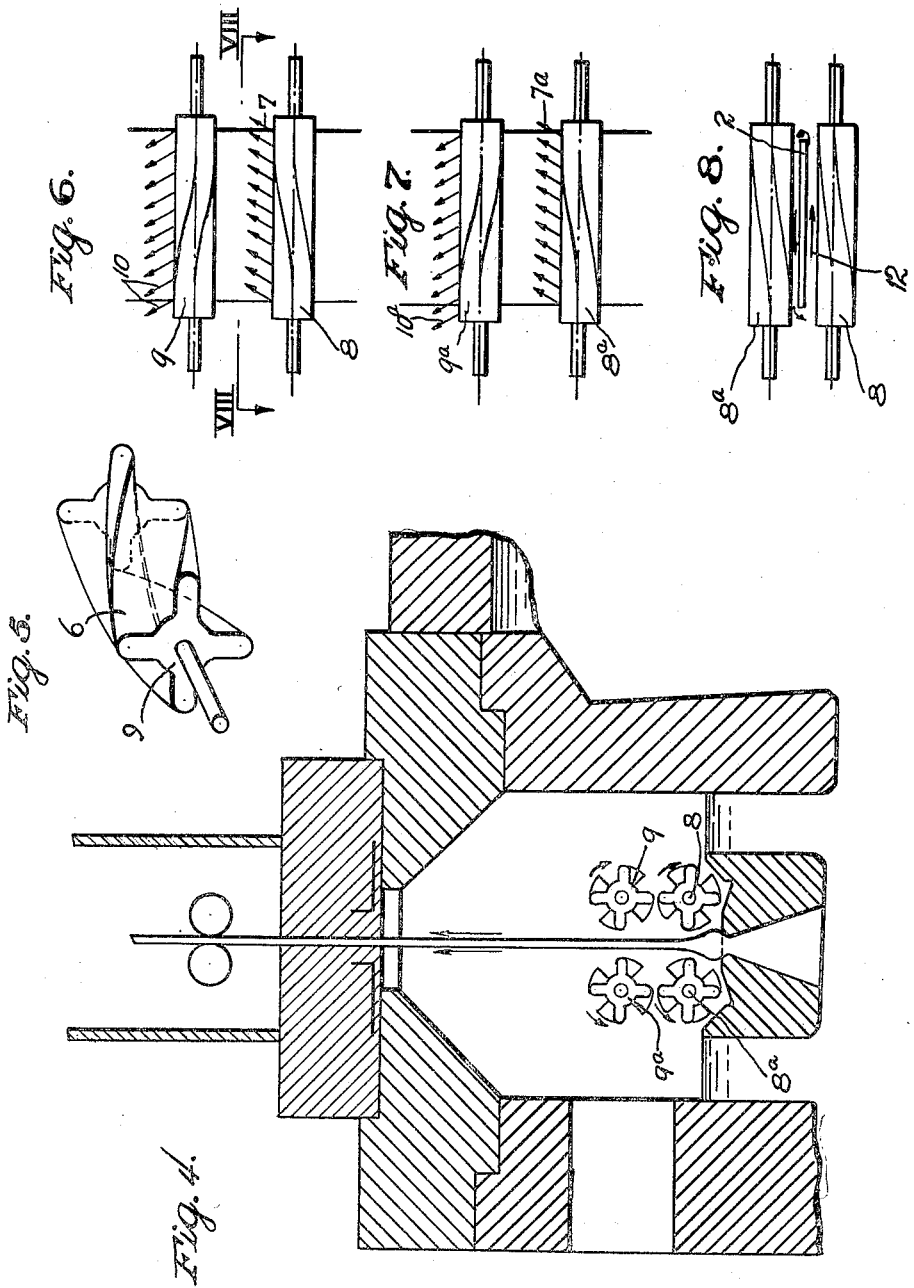

Patented Feb. 27, 1951

2,543,225

UNITED STATES PATENT OFFICE 2,543,225

DRAWING OF FLAT GLASS

Louis Jean Marie Bonjour, St. Jean des Vignes, France, assignor, by mesne assignments, to Pittsburgh Plate Glass Company, Pittsburgh, Pa., a company of Pennsylvania Application September 22, 1945, Serial No. 617,943
In France January 5, 1944

Section 1, Public Law 690, August 8, 1946
Patent expires January 5, 1964

3 Claims. (Cl. 49—17)

This invention relates to an improved apparatus for the continuous drawing of flat glass.

In drawing flat glass, with a view to obtaining a flat surface and an even thickness, difficulties arise which are largely due to the setting up in the neighbourhood of the sheet, as a result of its vertical position, of air currents caused by chimney effect and which often differ in intensity at different points across the width of the sheet.

The present invention overcomes said difficulties by imparting to the atmosphere in contact with the sheet a movement which is the same at all points along a horizontal line transverse to the drawn sheet of glass. According to the invention, said movement is imposed upon the atmosphere in contact with each side of the sheet being drawn by one or several paddles or blades, moving in the neighbourhood of the sheet, passing at a very small distance from same, and acting on practically its whole width, the paddles situated on a same side of the sheet being all moved in the same direction.

The use of such paddles affords several advantages, viz:

In the first place, by their movement the paddles permit the creation at the surface of the glass sheet of a movement of air, as rapid as desired, and are consequently adapted to suppress, or in any case to render negligible, the irregular relatively slow and uncontrollable movements of air which would normally tend to be set up perpendicularly to the movement of the paddles.

In the second place, by their disposition, the paddles oppose the setting-up of any gaseous currents in the direction of movement of the paddles other than those which they themselves impart.

Accordingly, the effect produced by the paddles suppresses the irregular currents of any kind capable of giving rise to faults in the flatness of the surface and also faults of the surface which frequently arise in the manufacture of the sheets. Such advantages were not obtained by prior methods.

In fact, it has already been proposed to regularize by air jets the conditions of formation of the sheet from the glass bath, but devices designed for such purposes, while creating swift currents, do not give absolutely regular currents, and offer no obstruction to natural currents transverse to the sheet. It has also already been proposed to agitate the atmosphere surrounding the drawn sheet by means of fans above one another rotating in opposite direction and tending to hinder the continuous movement of the air along the sheet and to substitute to same a local stirring. But such fans have the disadvantage, because of the opposite direction of the rotation of the fans on the successive levels, of creating vortices, having no preferential direction, and of not being able to regularly break up the natural currents transverse to the movement of the sheet.

In practice, my invention may be carried out by means of a mechanical device comprising at least one bladed, rotatable cylinder on each side of the drawn sheet, the blades of each side extending across the whole width of the sheet and passing close to it. Such bladed cylinders are placed at a small height above the glass bath. They impart to the gaseous streamlets a uniform speed approximating the circumferential speed of the extremities of the blades.

The bladed cylinders may be so constructed that they can be cooled by any suitable means and they can therefore play a part in the thermal conditioning of the atmosphere.

The thus imposed uniform movement of the gaseous currents is substituted for the irregular free currents which would prevail in the zone of action of the bladed cylinders if the latter did not exist. Practically it is sufficient for said zone of action to have a limited extension corresponding to the zone where the drawn glass sheet has not yet cooled below 700° C. In a general way, it is possible to act in the whole useful zone by means of only one cylinder on each side of the sheet, but it may be also advisable to use several cylinders on each side, then using small diameter cylinders which are favorable for an easy mounting and for acting nearer to the glass bath. In that case several cylinders are placed above one another, the cylinders on a same side of the sheet rotating all in the same direction.

The shafts of the rotating cylinders may be mounted so that they are adjustable in position according to the requirements of the production; particularly the shafts of the cylinders may be placed in positions which, on one side of the sheet, are different from the other side, to compensate for the different thermal conditions that sometimes exist on the two sides of the sheet.

The paddles of the cylinders may be set on the generating lines of said cylinders. In that case they impart to the gaseous streamlets a movement perpendicular to the axis of the cylinders, and consequently vertical; said movement may be either upwards or downwards, having the same direction (upwards or downwards) on both sides or being directed upwards on one side and downwards on the other side of the sheet. The paddles may also be helical, in which case the motion imparted to the gaseous streamlets has a horizontal component and consequently is inclined in respect to the vertical.

In a particular embodiment, several cylinders are placed above one another, on each side of the sheet, and provided with helical blades, the helices having opposite senses from one cylinder to the other one; consequently the paddles are so arranged that each of them will impart to the air a movement having a horizontal component opposite to that produced by the paddles of the next cylinder or cylinders. As a result while the air movement is practically vertical, a given air streamlet will not constantly remain in contact with the same vertical generating line of the glass sheet, thus preventing the possible formation of striae or other defects having a tendency to appear on lines parallel to the direction of draw.

In an other embodiment of the invention, the cylinders are provided with helical blades and are situated on the same level on both sides of the sheet; they are given such rotating direction and the helices are of such sense that the horizontal action of one of the cylinders will be directed towards one edge of the sheet while the horizontal action of the other cylinder will be directed towards the other edge.

It is of course possible to combine several of the features of the above mentioned embodiments as well concerning the modalities of air movement on the faces of the sheet as the modalities of air movement on one face in respect to the other.

The devices according to my invention may be utilized in the different processes for drawing glass, for instance in the drawing processes known as Pittsburgh and Fourcault processes.

The characteristic features of the invention and some of its advantages will appear from the following description referring to diverse embodiments of said invention.

In the accompanying drawings, which show diagrammatically and by way of example, two alternative forms of the invention:

Figure 1 is a diagrammatic section through a drawing apparatus of the Pittsburg type, with a pair of cylinders each provided with four equidistant blades.

Figure 2 is a perspective view showing one of the cylinders and blades illustrated in Figure 1.

Figure 3 is a diagrammatic side view showing one of the cylinders illustrated in Figure 1 and the glass sheet, Figure 4 is a diagrammatic section through a drawing apparatus of the Fourcault type, with four cylinders; each provided with four equidistant blades, Figure 5 is a perspective view showing one of the cylinders with helical blades illustrated in Figure 4, Figures 6 and 7 are diagrammatic side views of the cylinders and blades illustrated in Figure 4 seen from the two sides of the sheet respectively; and Figure 8 is a plan view, partially in horizontal section and looking down upon the lower pair of cylinders illustrated in Figure 4, the section being taken substantially along the line VIII—VIII of Fig. 6.

In the first embodiment, there are two cylinders 1 and 1a, placed at the same level on both sides of the glass sheet 2. Such cylinders, as represented in detail in the unit shown in Fig. 2, have rectilinear paddles 3 disposed along generating lines of said cylinders, and they are turned in opposite senses as shown by the arrows in Figure 1, so that the movement of the blades, when close to the sheet, is vertically upwards. Thereby an upward movement is imposed on the air close to the sheet as indicated by the arrows 4 in Fig. 3. The rotating shafts 5 of the cylinders are set on bearings which are not shown for the sake of clearness.

In the second embodiment shown in Figures 4 to 8, two cylinders 8 and 9, each with four helical blades 6 are mounted on one side of the drawn sheet and similar cylinders 8a and 9a each carrying four similar blades are mounted on the other side. Said cylinders, owing to the helical shape of the paddles, impart to the gaseous atmosphere a movement inclined with respect to the drawing direction.

Figs. 6 and 7, which are vertical side views, each corresponding to one side of the glass sheet, show the direction of said movement, such direction as indicated at 7—7a being inclined towards the right side for the cylinders 8—8a of the lower level. As to cylinders 9—9a of the higher level, such cylinders rotate in the same direction as the cylinders of the lower level but with their helices in senses opposite to the helices of said lower cylinders; they cause an inclination of the gaseous streamlets which is in reverse sense with respect to the inclination imparted by the preceding cylinders, i. e. towards the left as shown at 10 for the side of the glass sheet represented by Figure 6 and also towards the left as shown at 10a for the side represented by Figure 7.

The operation proceeds as if, at each level of the cylinders, in addition to the movement of the fluids parallelly to the drawing direction a movement were superimposed in a horizontal plane tending to set up a circulatory movement around the sheet as shown at 12 on Fig. 8 with respect to the cylinders 8 and 8a, and conversely in reverse directions with reference to the cylinders 9 and 9a.

While in this specification reference is made to "air" movements, it is to be understood that this includes movements of any gaseous atmosphere as required by practical considerations.

What is claimed is:

1. In an apparatus including means for drawing a glass sheet vertically from a molten glass bath through a substantially enclosed drawing chamber; a plurality of helical paddles rotatable on substantially horizontal axes and extending transversely in the drawing chamber adjacent each side of the glass sheet, the helices of each paddle extending from a location at one edge of the glass sheet entirely across the width of the latter to a location adjacent the other edge of the sheet, atmosphere in contact with the glass sheet adjacent the helices being movable along the surfaces of the glass transversely and obliquely from one edge to the other of the glass sheet in response to the rotation of the paddles.

2. In an apparatus including means for drawing a glass sheet vertically from a molten glass bath through a substantially enclosed drawing chamber; a plurality of cylinders rotatable on substantially horizontal axes and extending transversely in the drawing chamber adjacent each side of the glass sheet, at least one helix mounted on each cylinder in close proximity to the glass sheet and extending from a location at one edge of the glass sheet across the entire width of the latter to the other edge of said sheet, all of the cylinders on the same side of the glass sheet being rotatable in the same direction, atmosphere in contact with the glass sheet being movable uniformly along the surfaces of the glass transversely and obliquely from one edge to the other of the glass sheet in response to the specified rotation of the cylinders.

3. In an apparatus including means for drawing a glass sheet vertically from a molten glass bath through a substantially enclosed drawing chamber; a plurality of cylinders rotatable on substantially horizontal axes and extending transversely in the drawing chamber adjacent each side of the glass sheet, each cylinder having at least one helical vane extending from a location at one edge of the glass sheet entirely across the width of the latter to a location adjacent the other edge of said sheet, the helical vanes on adjacent cylinders on one side of the sheet being of opposite senses and the cylinders on each side of the glass sheet being disposed one above another in substantially vertical alignment adjacent the surface of the glass.

LOUIS JEAN MARIE BONJOUR.

REFERENCES CITED

The following references are of record in the file of this patent:

UNITED STATES PATENTS

| Number | Name | Date |
| --- | --- | --- |
| 2,002,544 | Monro | May 28, 1935 |
| 2,116,693 | Bishop | May 10, 1938 |
| 2,158,669 | Amsler | May 16, 1939 |
| 2,201,286 | Bundy | May 21, 1940 |
| 2,278,328 | Magrini | Mar. 31, 1942 |
| 2,287,136 | Rolland et al. | June 23, 1942 |

FOREIGN PATENTS

| Number | Country | Date |
| --- | --- | --- |
| 17,958 | France | Jan. 16, 1857 |